United States Patent
Andreoli-Fang et al.

(10) Patent No.: US 12,089,082 B1
(45) Date of Patent: *Sep. 10, 2024

(54) MULTICHANNEL COMMUNICATION SYSTEMS

(71) Applicant: CABLE TELEVISION LABORATORIES, INC., Louisville, CO (US)

(72) Inventors: Jennifer Andreoli-Fang, Boulder, CO (US); Alireza Babaei, Herndon, VA (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/230,911

(22) Filed: Aug. 7, 2023

Related U.S. Application Data

(63) Continuation of application No. 17/107,259, filed on Nov. 30, 2020, now Pat. No. 11,722,913, which is a continuation of application No. 16/439,258, filed on Jun. 12, 2019, now abandoned, which is a continuation of application No. 14/926,515, filed on Oct. 29, 2015, now Pat. No. 10,327,164.

(51) Int. Cl.
| | |
|---|---|
| *H04W 72/04* | (2023.01) |
| *H04W 24/08* | (2009.01) |
| *H04W 28/08* | (2023.01) |
| *H04W 28/082* | (2023.01) |
| *H04W 76/15* | (2018.01) |

(52) U.S. Cl.
CPC ......... *H04W 24/08* (2013.01); *H04W 28/082* (2023.05); *H04W 76/15* (2018.02)

(58) Field of Classification Search
CPC ..... H04L 47/10; H04L 43/50; H04L 12/2697; H04L 43/0852; H04L 43/00; H04W 24/08; H04W 28/085; H04W 76/025; H04W 76/15; H04W 28/082
USPC .......................................................... 370/252
See application file for complete search history.

(56) References Cited

U.S. PATENT DOCUMENTS

| | | | |
|---|---|---|---|
| 5,579,341 A | 11/1996 | Smith et al. | |
| 5,638,369 A | 6/1997 | Ayerst et al. | |
| 5,710,771 A | 1/1998 | Jeno | |
| 5,918,169 A | 6/1999 | Dent | |
| 5,999,561 A | 12/1999 | Naden et al. | |
| 7,310,348 B2 | 12/2007 | Trinh et al. | |
| 7,330,888 B2 | 2/2008 | Storry et al. | |
| 7,852,778 B1 * | 12/2010 | Kompella | H04L 43/0811 370/242 |
| 8,102,783 B1 | 1/2012 | Narayanaswamy et al. | |
| 8,477,622 B2 | 7/2013 | Omar | |

(Continued)

*Primary Examiner* — Peter G Solinsky
*Assistant Examiner* — Sanjay K Dewan
(74) *Attorney, Agent, or Firm* — Josh C. Snider; Snider IP

(57) ABSTRACT

Systems and methods presented herein provide for multichannel communications. In one embodiment, a communication system includes a plurality of traffic channels operable to link to a UE via one or more communication networks. The communication system also includes a traffic processor operable to receive a request for data from the UE, to evaluate the traffic channels based on the requested data, to select a first and a second of the traffic channels based on the evaluation, and to convey the data over the first and second traffic channels to the UE.

20 Claims, 6 Drawing Sheets

(56) References Cited

U.S. PATENT DOCUMENTS

| | | | |
|---|---|---|---|
| 8,488,540 B2 * | 7/2013 | Yi | H04W 72/56 |
| | | | 370/252 |
| 8,675,605 B2 | 3/2014 | Charbit et al. | |
| 8,787,194 B2 | 7/2014 | Yang et al. | |
| 8,917,790 B2 | 12/2014 | Ko et al. | |
| 9,065,523 B2 | 6/2015 | Campos et al. | |
| 9,088,313 B2 | 7/2015 | Campos et al. | |
| 9,231,672 B2 | 1/2016 | Campos et al. | |
| 9,232,434 B2 | 1/2016 | Rong et al. | |
| 9,860,898 B1 | 1/2018 | Liu et al. | |
| 9,872,210 B2 | 1/2018 | Henderson et al. | |
| 9,924,370 B2 | 3/2018 | Cai et al. | |
| 10,798,775 B2 * | 10/2020 | Yu | H04W 28/06 |
| 11,570,015 B2 * | 1/2023 | Das | H04N 21/6168 |
| 11,711,284 B2 * | 7/2023 | Svennebring | H04L 41/147 |
| | | | 370/252 |
| 11,870,486 B2 * | 1/2024 | Aldana | G01S 13/765 |
| 2009/0116513 A1 | 5/2009 | Gray et al. | |
| 2010/0296407 A1 | 11/2010 | Medvedev et al. | |
| 2010/0315966 A1 * | 12/2010 | Weigand | H04L 41/0816 |
| | | | 370/252 |
| 2012/0051275 A1 | 3/2012 | Alex et al. | |
| 2012/0077466 A1 | 3/2012 | O'Mahony et al. | |
| 2012/0120838 A1 | 5/2012 | Farajidana et al. | |
| 2013/0013803 A1 | 1/2013 | Bichot et al. | |
| 2014/0016499 A1 | 1/2014 | Forenza et al. | |
| 2014/0032719 A1 | 1/2014 | Panwar | |
| 2014/0185485 A1 * | 7/2014 | Ponnuswamy | H04W 64/00 |
| | | | 370/252 |
| 2014/0201329 A1 * | 7/2014 | Himayat | H04N 21/631 |
| | | | 709/219 |
| 2014/0233661 A1 | 8/2014 | Campos et al. | |
| 2015/0146562 A1 * | 5/2015 | Sivanesan | H04L 69/163 |
| | | | 370/252 |
| 2015/0223075 A1 | 8/2015 | Bashar et al. | |
| 2016/0095110 A1 * | 3/2016 | Li | H04W 72/1215 |
| | | | 370/329 |
| 2021/0144192 A1 * | 5/2021 | Lee | G06F 16/955 |
| 2022/0141131 A1 * | 5/2022 | Rajamanickam | H04L 45/123 |
| | | | 370/252 |
| 2022/0271794 A1 * | 8/2022 | Aldana | G01S 13/765 |

* cited by examiner

MULTICHANNEL COMMUNICATION SYSTEMS

CROSS-REFERENCE TO RELATED APPLICATIONS

This patent application is a continuation of U.S. patent application Ser. No. 17/107,259, filed Nov. 30, 2020, which application is a continuation of U.S. patent application Ser. No. 16/439,258, filed Jun. 12, 2019. U.S. patent application Ser. No. 16/439,258 is a continuation of U.S. Patent Application No. 14/926,515, filed Oct. 29, 2015, now U.S. Pat. No. 10,327,164, issued Jun. 18, 2019, the entire contents of which are hereby incorporated by reference.

BACKGROUND

Many if not all modern mobile communication devices (e.g., smart phones, tablet computers, laptop computers, auto electronics, and other user equipment) are configured with multiple forms of communications. For example, a smart phone may be configured with a communication scheme, such as Long Term Evolution, to communicate voice and/or data packets through a network of a carrier. That same phone may also be configured with a WiFi transceiver for data communications in WiFi bands that are not licensed to any carriers. But, any given data is generally transmitted to the smart phone over a single communication link at a time. In other words, data is not split among the multiple communication links.

SUMMARY

Systems and methods presented herein provide for multichannel communications. In one embodiment, a communication system includes a plurality of traffic channels operable to link to a user equipment (UE) via one or more communication networks. The communication system also includes a traffic processor operable to receive a request for data from the UE, to evaluate the traffic channels based on the requested data, to select a first and a second of the traffic channels based on the evaluation, and to convey the data over the first and second traffic channels to the UE.

The various embodiments disclosed herein may be implemented in a variety of ways as a matter of design choice. For example, some embodiments herein are implemented in hardware whereas other embodiments may include processes that are operable to implement and/or operate the hardware. Other exemplary embodiments, including software and firmware, are described below.

BRIEF DESCRIPTION OF THE FIGURES

Some embodiments of the present invention are now described, by way of example only, and with reference to the accompanying drawings. The same reference number represents the same element or the same type of element on all drawings.

DETAILED DESCRIPTION OF THE FIGURES

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention and are to be construed as being without limitation to such specifically recited examples and conditions. As a result, the invention is not limited to the specific embodiments or examples described below.

Figure 1:
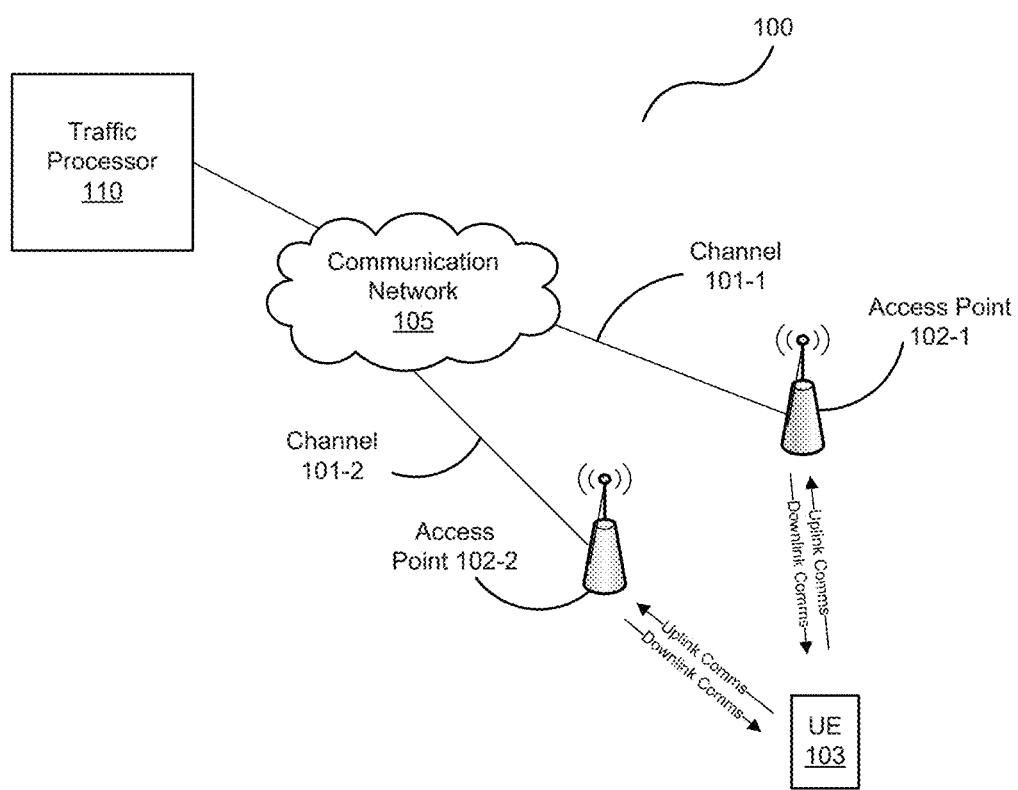
FIG. 1 is a block diagram of an exemplary multichannel communication system.

FIG. 1 is a block diagram of an exemplary multichannel communication system 100. In this embodiment, the communication system 100 includes a traffic processor 110 that is operable to separate data intended for user equipment (UE) 103 into multiple components and transfer the separated components of data across a number of traffic channels 101. For example, the UE 103 may request some form of digital audio and/or video content for delivery to the UE 103. The UE 103 may transfer this request through its associated communication network 105 such that the traffic processor 110 may retrieve the content. From there, the traffic processor 110 identifies components of the content that may be separated and directs the communication network 105 to convey the separated components over multiple traffic channels 101-1 and 101-2. The UE 103 then receives the content components through downlink communications of various access points 102. From there, the UE 103 may combine the content components into its original form for use by the user of the UE 103.

As used herein, the traffic processor 110 is any device, software, system, or combination thereof operable to separate content into multiple components and direct the content components to user equipment 103 across multiple traffic channels 101. Examples of the traffic processor 110 include computer servers, databases, mobile telephony network elements, and various combinations thereof. Examples of the communication network 105 include Wi-Fi networks, mobile telephony networks (e.g., Long Term Evolution—"LTE", 3G, etc.), Bluetooth mesh networks, and the like. In this regard, the access points 102 may be mobile telephony base stations, wireless access points (WAPs), and/or other UEs. Examples of the UE 103 include tablet computers, laptop computers, smart phones, and the like.

Although illustrated with a single communication network 105, the invention is not intended to be limited to one type of network. Rather, the communication network 105 may be representative of multiple communication networks. For example, the traffic processor 110 may separate data into a first and second components. The traffic processor 110 may transfer the first component of data along the traffic channel 101-1 via Wi-Fi protocols and transfer the second component of data along the traffic channel 101-2 via LTE protocols.

In some embodiments, the traffic processor 110 may be operable to duplicate data for distribution to the UE 103. For example, the traffic processor 110 may deem certain components of the data as more important than others. The traffic processor 110, in this regard, may duplicate those components and transfer them across multiple traffic channels 101 to the UE 103 so as to provide redundancy in the data communications.

Figure 2:
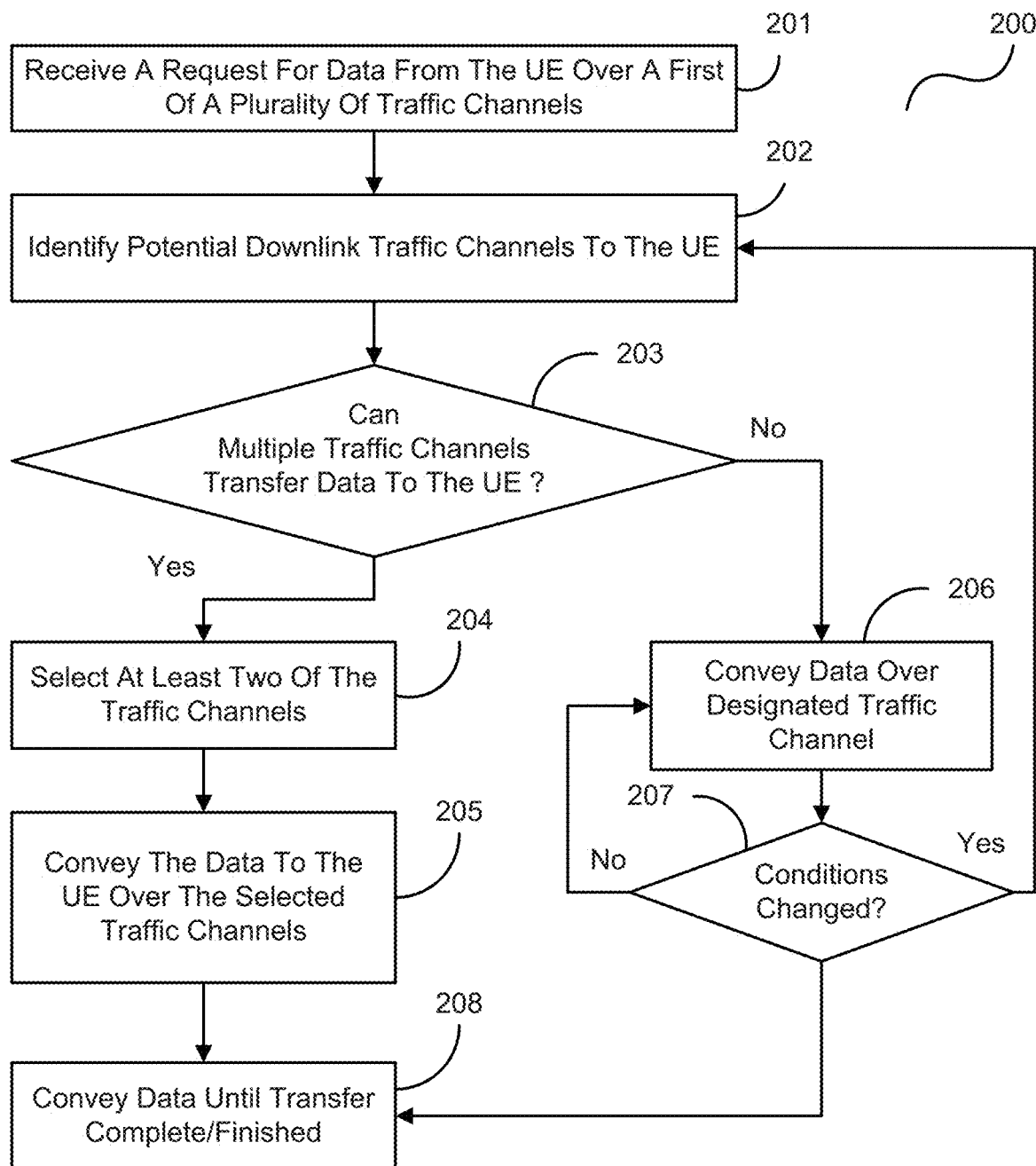
FIG. 2 is a flowchart illustrating an exemplary process of the multichannel communication system of FIG. 1.

FIG. 2 is a flowchart illustrating an exemplary process 200 of the multichannel communication system 100 of FIG. 1. In this embodiment, the traffic processor 110 receives a request for data from the UE 103 over a first of a plurality of traffic channels, in the process element 201. The traffic processor 110 identifies potential downlink traffic channels to the UE 103, in the process element 202. For example, the traffic processor 110 may identify a location of the UE 103 based on information transferred along with the request for data from the UE 103. The traffic processor 110 may then determine access points 102 in the vicinity of the UE 103 that are operable to convey data to the UE 103.

Afterwards, the traffic processor 110 determines whether multiple traffic channels 101 can be used to transfer data to the UE 103, in the process element 203. If a single traffic channel 101 is operable to convey the data, then the traffic processor 110 does not separate the data and instead conveys the data over the designated traffic channel 101, in the process element 206. However, the traffic processor 110 continually monitors whether other access points 102 may be operable to assist in distributing the data. For example, as the UE 103 moves about and closer in proximity of another access point 102, the other access point 102 may improve in connectivity (e.g., signal strength) to allow UE 103 better reception through that access point 102. Accordingly, if the conditions change, in the process element 207, then the process 200 returns to the process element 202 to identify other potential downlink traffic channels 101 for the UE 103. Otherwise, the traffic processor 110 continues conveying data over the designated traffic channel 101, in the process element 206.

If multiple traffic channels 101 are operable to transfer the data to the user equipment 103, in the process element 203, then the traffic processor 110 selects at least two of those traffic channels 101, in the process element 204 and conveys the data to the UE 103 over the selected traffic channels 101, in the process element 205. The process 200 is operable to convey the data until the data transfer is complete and/or the UE 103 is finished with the data, in the process element 208.

Figure 3:
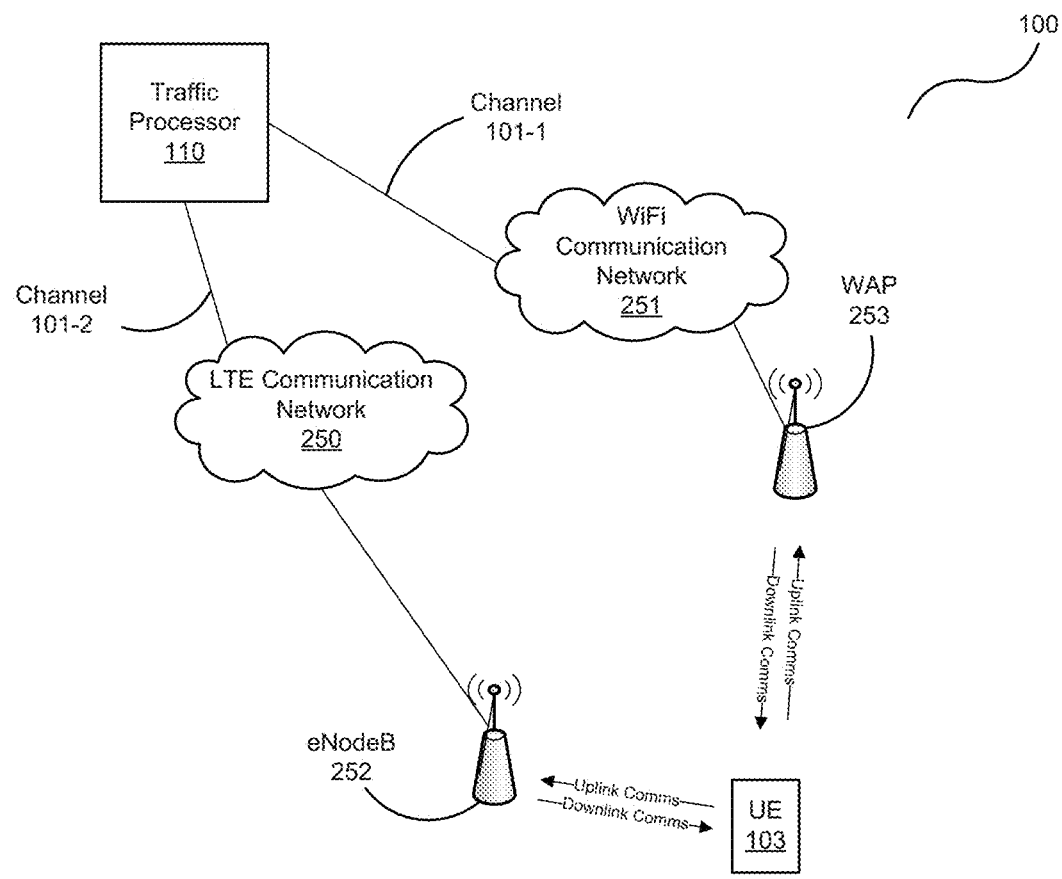
FIG. 3 is a block diagram of another exemplary multichannel communication system.

FIG. 3 is a block diagram of another exemplary multichannel communication system 100. In this embodiment, the communication system 100 is illustrated with two separate communication networks. An LTE communication network 250 is operable to communicate with the UE 103 via the uplink and downlink communications of eNodeB 252 under control of the LTE communication network 250. A Wi-Fi communication network 251 is operable to communicate with the UE 103 via uplink and downlink Wi-Fi communications of a wireless access point (WAP) 253.

The traffic processor 110 is operable to retrieve content requested by the UE 103 and split that content into multiple components for conveyance to the UE 103 via the LTE communication network 250 and the Wi-Fi communication network 251. For example, a user of the UE 103 may wish to download (e.g., "stream") a movie to the UE 103. The UE 103 may send a request through the LTE communication network 250 which is processed by the traffic processor 110. The traffic processor 110 may in turn retrieve the movie and separate it into various components. The traffic processor 110 may then convey one or more the components over the LTE communication network 250 and the remaining components over the Wi-Fi communication network 251.

As mentioned, the UE 103 may be representative of a wireless device as wireless devices with 3G/4G cellular and Wi-Fi radios are now commonplace. Depending on the location of the UE 103, both cellular and Wi-Fi capacity (residential Wi-Fi, public hotspots, homespots, etc.) may be available. Since video applications generally require high bandwidth, the capacity offered by Wi-Fi networks can be of great value. And, both cellular and Wi-Fi technologies can be used to transport different layers of scalable coded video streams. In particular, a "base layer" of coded video can be transmitted through the more reliable cellular radio of the LTE communication network 250 while the additional layers can be transmitted opportunistically (e.g., depending on the availability of Wi-Fi capacity) through the Wi-Fi radio of the Wi-Fi communication network 251 to provide additional video quality.

To illustrate, scalable video coding enables transmission of video streams with increasing levels of spatial, temporal, and/or picture quality through a layered architecture. While the base layer can provide a reasonable video quality, the quality can be increasingly enhanced by transmission of additional layers. Thus, the base layer of scalable coded video can be streamed through the more reliable cellular radio of the LTE communication network 250 to ensure that the video is delivered. And, if Wi-Fi capacity is available, the UE 103 can negotiate with the Wi-Fi communication network 251 through the WAP 253 regarding an amount of Wi-Fi capacity that can be used for the transmission of additional layers.

This approach can also provide monetization opportunities for cable operators by offering Wi-Fi capacity through their respective public hotspots or community Wi-Fi (a.k.a., "homespots") to cellular subscribers to enhance their video quality in an "on-demand" basis. For example, the UE 103 may convey the IP (Internet protocol) address assigned by the WAP 253 through its Wi-Fi interface to the cellular operator of the LTE communication network 250. Depending on the negotiated capacity with operator of the Wi-Fi communication network 251, the cellular operator could then transmit the additional video layers to the UE 103 through the Wi-Fi communication network 251 for enhancing the video quality. And, the cellular operator would be obligated to the operator of the Wi-Fi communication network 201 for the additional layers being transmitted to the UE 103.

Generally, since the base layer and additional layers packets transmitted through LTE communication network 250 and the Wi-Fi communication network 251 may experience different delay, synchronization of the layers may be necessary. However, the synchronization may be implemented with a data buffer at the device or at the network (e.g., a store and forward buffer).

Although only the LTE communication network 250 and the Wi-Fi communication network 251 are illustrated, the invention is not intended to be so limited. For example, the concepts herein may be implemented with any of a variety of different types of communication networks and thus different types of traffic channels 101. Some examples of how the data may be diversified among different traffic channels 101 include: coverage of both LTE macro cell and a small cell; coverage of a LTE-U small cell using both licensed and unlicensed spectrum; coverage of both LTE and Wi-Fi; and/or having the UE 103 connect to an hybrid fiber coaxial (HFC) headend via both HFC infrastructure and pole-mounted Wi-Fi repeater network on the HFC infrastructure with the coaxial portion of the traffic channels 101 being independent of the wireless portion of the traffic channels 101.

Generally, at any given time, the UE 103 may be "attached" to transmit/receive information using one of a number of possible traffic channels 101. It may also be the case that multiple traffic channels 101 have the same attachment point to its core network (e.g., licensed and unlicensed spectrum where the endpoint is the same LTE-U eNodeB). When all of the traffic channels 101 are managed by a single entity (e.g., a single service provider), splitting the traffic among different traffic channels 101 helps to increase the diversity and improve the overall performance. And, duplicated transmissions for more "important" data packets on more than one traffic channel 101 can create spatial redundancy and improve overall system performance.

Each attachment point (e.g., access points 102) could correspond to one or more traffic channels 101. For example, an LTE-U eNodeB could correspond to traffic channels 101 on licensed and unlicensed spectrum. A controller in the service provider's core network could intelligently split the outbound traffic to the attachment points and aggregate the inbound traffic received from the attachment points. The UE 103 would also perform similar traffic splitting/aggregation functionality. To synchronize the splitting/aggregation functionalities in the traffic processor 110 and the UE 103, control information would be exchanged. This control information could be similarly split/aggregated using multiple traffic channels 101 or even be transmitted using one of the transmission channels 101. The control information may also include: downlink/uplink channel estimation for wireless traffic channels 101; interference levels on different traffic channels 101 at the receiver; and traffic congestion indicators on different traffic channels 101. The traffic splitting/aggregation functionalities of the traffic processor 110 and/or the UE 103 would generally take into account this and other information to determine how to split the traffic among the various traffic channels 101. Examples of such are shown and described below in FIGS. 4 and 5.

Figure 4:
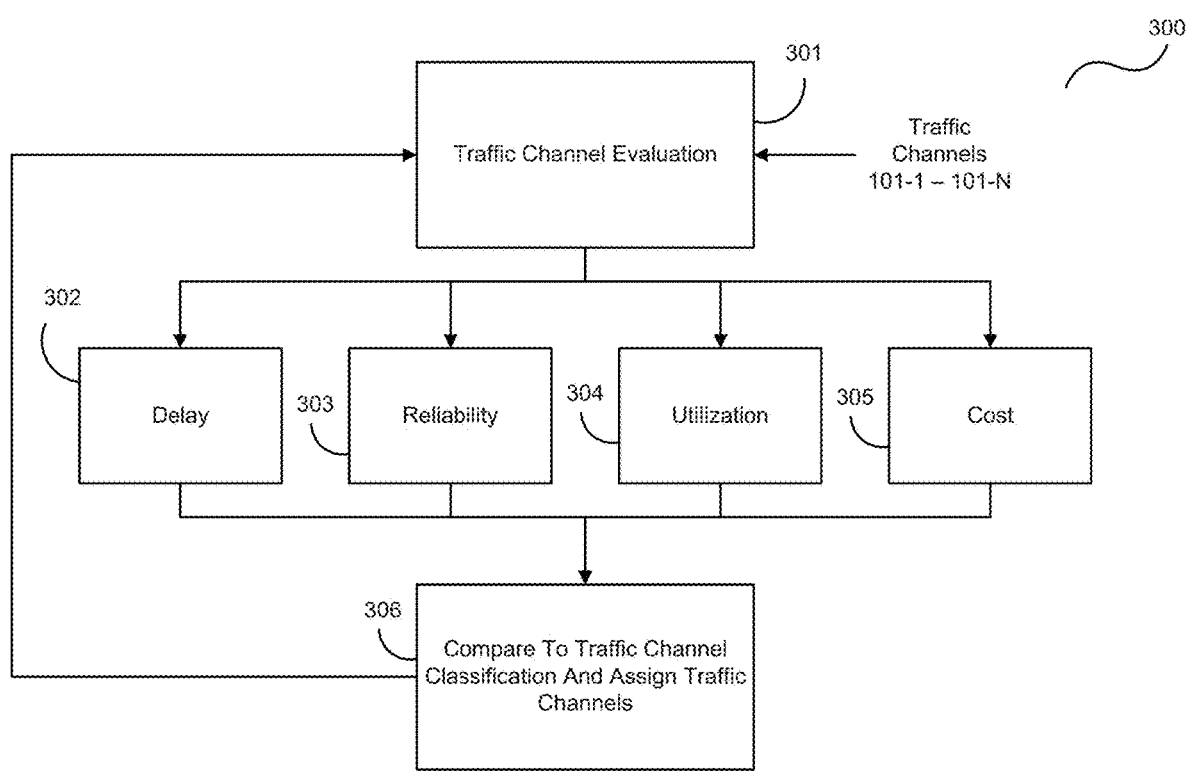
FIG. 4 is a flowchart of an exemplary channel selection algorithm.

FIG. 4 is a flowchart of an exemplary channel selection algorithm 300. In this embodiment, the traffic processor 110 monitors each of the traffic channels 101-1-101-N that are operable to communicate with the UE 103 (wherein the reference "N" is merely intended to represent an integer greater than one and not necessarily equal to any other "N" reference designated herein). In monitoring the traffic processor 110, the traffic processor 110 gathers certain information or metrics about each of the traffic channels 101 to initiate evaluation of the traffic channels 101, in the process element 301. For example, the traffic processor 110 may monitor delays 302 associated with certain traffic channels 101, reliability issues 303 associated with the traffic channels 101, the primary forms in which the traffic channels 101 are being utilized 304, and the costs 305 associated with the traffic channels 101.

Each of these metrics may be given some weight such that the traffic processor 110 may compare their values and assign traffic channels 110 to deliver the content to the UE 103. For example, the cost 305 of delivering the content over particular traffic channel 101 may outweigh delays 302 incurred by delivering the content over other traffic channels 101. In any case, once the metrics are determined, the traffic processor 110 selects two or more "winning" traffic channels 101 to deliver the content to the UE 103. Other metrics that can be used by the traffic processor 110 to determine how the content is split among the traffic channels 101 include Quality of Service (QOS), the types of video frames (e.g., "I" frames vs. "P" frames), packet types (e.g., TCP ACK being prioritized over others), congestion on the traffic channels 101, and efficiency of retransmission (e.g., HARQ in LTE vs. packet level ACK in Wi-Fi). And, as the traffic processor 110 continually monitors the traffic channels available to the UE 103, the traffic processor 110 can adaptively change the traffic channels 101 selected for the UE 103 based on changing conditions to the metrics.

For example, based on a content type for each packet of content, relevant metrics such as throughput, delay, and jitter are known. A user ID also provides insight to the amount of revenue for transmitting each packet. With this in mind, assume that there are two packets and three paths. Each packet needs to be mapped to one or more of the three paths. So, a utility function for each content type may be defined. For video, one exemplary utility function would be $$U_{vid}(m;X)=A_1 m_1+A_2 m_2+A_3 m_3+ \ldots \qquad \text{Equation 1.}$$

where the $m=[m_1, m_2, m_3 \ldots ]$ are the values of the metrics for a particular channel X and $A=[A_1, A_2, A_3 \ldots ]$ are the coefficients which are determined based on the content. Then, a vector A can be defined for each content type. Thus, when a packet arrives, the content type is determined assuming it is known to be using some flow type identification in the packet. Then, the utility of the packet for each channel is computed such that the packet may be transmitted on the channel(s) with highest utility.

Generally, the values of A1, A2, ... are content dependent coefficients that weight each of the performance metrics for a particular content type. For example, in video, typical metrics are throughput, delay, and jitter. So, let throughput correspond to A1 and delay correspond to A2. And, A1 can be assigned a larger weight compared to A2 because video throughput is more important than delay. The utility function for the other content types can be defined similarly.

And, instead of using the m's "as is", the equation may be implemented as a function f(m) for video. For example:

$$U_{vid}(f(m);X)=A_1 f(m_1)+A_2 f(m_2)+A_3 f(m_3)+ \ldots \qquad \text{Equation 3.}$$

where again A1 is throughput, A2 is delay, A3 is jitter. Using exemplary numbers, $$U\_vid(m;X)=A_1*\{m_1-50\}+A_2*\{4-m_2\}+A_3*\{10-m_3\}, \qquad \text{Equation 4.}$$

where the function $\{z\}$ is defined as $=\max(z, 0)$. In other words, $\{z\}=z$ if $z>0$ and $\{z\}=0$ if $z\leq 0$. So, in this example, $\{m_1-10\}=1$ if $m_1=11$ and $\{m_1-10\}=0$ if $m_1=9$.

As mentioned, relative importance of throughput, delay, and jitter for video, can be assigned the following weights for video $A_1=10$, $A_2=2$, and $A_3=1$. Then, if there are two channels X and Y and each channel has the following metrics values:

$m_1(X)=100$ (e.g., in Mbps)
$m_2(X)=10$ (e.g., in msec)
$m_3(X)=30$ (e.g., in msec)
$m_1(Y)=50$ (e.g., in Mbps)
$m_2(Y)=1$ (e.g., in msec)
$m_3(Y)=3$ (e.g., in msec)

U_vid for video data under consideration can be calculated as U_vid(m; X)=500 and U_vid(m; Y)=13. Accordingly, the data under evaluation would be transmitted on channel X.

Figure 5:
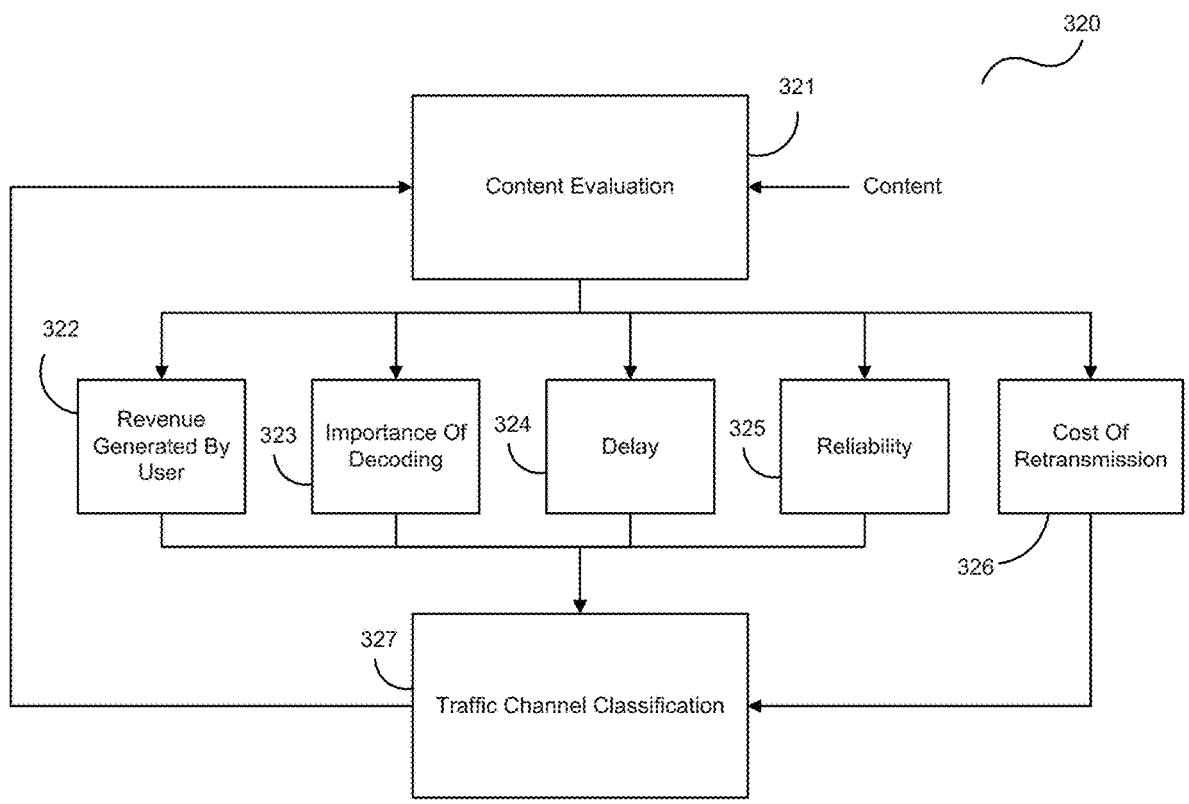
FIG. 5 is a flowchart of an exemplary data-to-channel assignment algorithm.

When the content is retrieved by the traffic processor 110, the traffic processor may also take in consideration how the content is to be assigned to various traffic channels 101. FIG. 5 is a flowchart of an exemplary data-to-channel assignment algorithm 320 that may operate independently from the channel selection algorithm 300 of FIG. 4. In this embodiment, the content is received at the traffic processor 110 by a content evaluation module 321. The content evaluation module 321 also uses a variety of metrics to evaluate the content so as to determine a type of traffic channel 101 that may be used to effectively transfer the content. Some exemplary metrics include revenue 322 generated by the user selecting the content, the importance of decoding the content 323, any acceptable delays 324 in delivering the content to the UE 103, the reliability 325 of the content, and any costs 326 associated with retransmitting the content over the traffic channels 101. Once these metrics are computed for a particular content be delivered to the UE 103, the traffic channel classification module 327 determines the appropriate traffic channel 101 that can be used for transmission of the content to the UE 103. The appropriate traffic channel 101 may be computed via a utility function in a manner similar that described in FIG. 4.

Figure 6:
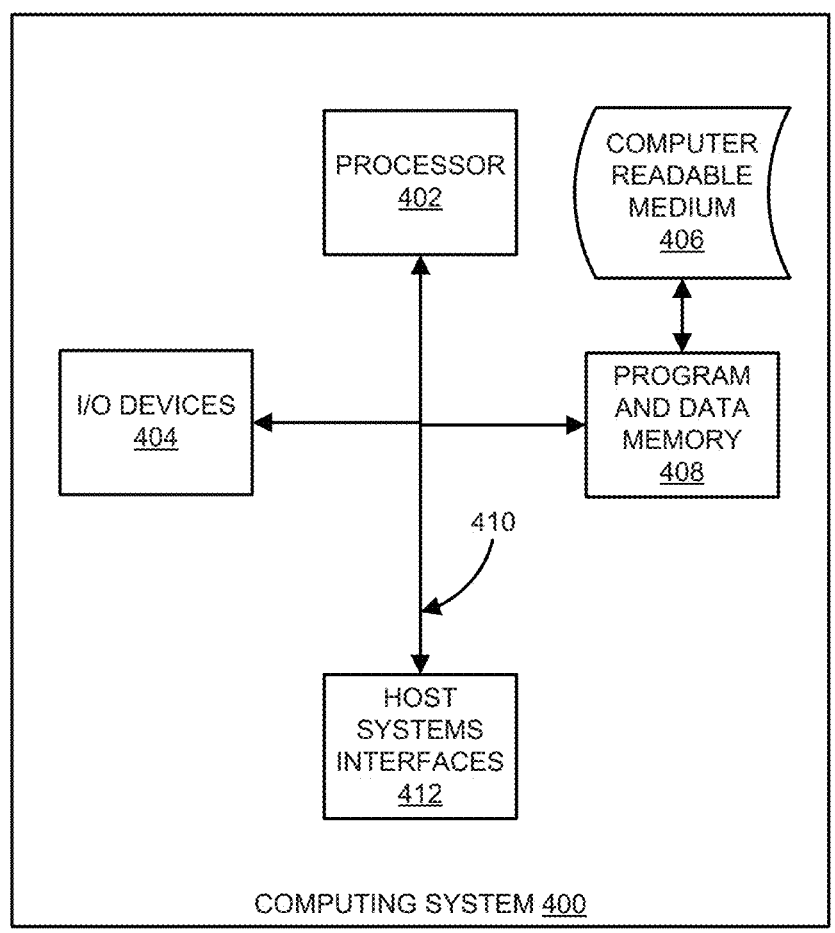
FIG. 6 is a block diagram of an exemplary computing system in which a computer readable medium provides instructions for performing methods herein.

The invention can take the form of an entirely hardware embodiment, an entirely software embodiment or an embodiment containing both hardware and software elements. In one embodiment, the invention is implemented in software, which includes but is not limited to firmware, resident software, microcode, etc. FIG. 6 illustrates a computing system 400 in which a computer readable medium 406 may provide instructions for performing any of the methods disclosed herein.

Furthermore, the invention can take the form of a computer program product accessible from the computer readable medium 406 providing program code for use by or in connection with a computer or any instruction execution system. For the purposes of this description, the computer readable medium 406 can be any apparatus that can tangibly store the program for use by or in connection with the instruction execution system, apparatus, or device, including the computer system 400.

The medium 406 can be any tangible electronic, magnetic, optical, electromagnetic, infrared, or semiconductor system (or apparatus or device). Examples of a computer readable medium 406 include a semiconductor or solid state memory, magnetic tape, a removable computer diskette, a random access memory (RAM), a read-only memory (ROM), a rigid magnetic disk and an optical disk. Some examples of optical disks include compact disk-read only memory (CD-ROM), compact disk-read/write (CD-R/W) and DVD.

The computing system 400, suitable for storing and/or executing program code, can include one or more processors 402 coupled directly or indirectly to memory 408 through a system bus 410. The memory 408 can include local memory employed during actual execution of the program code, bulk storage, and cache memories which provide temporary storage of at least some program code in order to reduce the number of times code is retrieved from bulk storage during execution. Input/output (I/O) devices 404 (including but not limited to keyboards, displays, pointing devices, etc.) can be coupled to the system either directly or through intervening I/O controllers. Network adapters may also be coupled to the system to enable the computing system 400 to become coupled to other data processing systems, such as through host systems interfaces 412, or remote printers or storage devices through intervening private or public networks. Modems, cable modem and Ethernet cards are just a few of the currently available types of network adapters.

What is claimed is:

1. A traffic processing apparatus for a multichannel communication system, comprising:
   a processor; and
   a memory device configured to store computer-executable instructions therein, which, when executed by the processor, cause the processor to:
   (a) receive a request for data;
   (b) identify first and second data components of the requested data; and
   (c) convey (i) the first data component over a first traffic channel of the multichannel communication system according to the first communication protocol, (ii) the second data component over the second traffic channel of the multichannel communication system according to a second communication protocol different from the first protocol, and (iii) a duplicate of the second data portion over a third traffic channel of the multichannel communication system according to the first communication protocol.

2. The traffic processing apparatus of claim 1, wherein the instructions further cause the processor to determine that the first data component over the first traffic channel is associated with the second data component over the second traffic channel and the duplicate of the second data component over the third traffic channel.

3. The traffic processing apparatus of claim 1, wherein the instructions further cause the processor to instruct receiving device to combine the first data component with at least one of the second data component and the duplicate of the second data component.

4. The traffic processing apparatus of claim 1, wherein the instructions further cause the processor to prioritize the first and second data components into first and second priorities, respectively.

5. The traffic processing apparatus of claim 4, wherein the instructions further cause the processor to generate the duplicate of the second data component based on a determination that the second priority is higher than the first priority.

6. The traffic processing apparatus of claim 1, wherein the instructions further cause the processor to evaluate the first and second traffic channels according to traffic speed, cost, and reliability of the first and second traffic channels.

7. The traffic processing apparatus of claim 1, wherein (i) the first communication protocol is a cellular communication protocol and the second communication protocol is a Wi-Fi communication protocol, or (ii) the first communication protocol is a Wi-Fi communication protocol and the second communication protocol is a cellular communication protocol.

8. The traffic processing apparatus of claim 1, wherein the instructions further cause the processor to monitor the first, second, and third traffic channels to adapt to changing conditions thereof.

9. The traffic processing apparatus of claim 1, wherein the third traffic channel is (i) the first traffic channel, or (ii) different from the first traffic channel.

10. The method of claim 9, further comprising:
    monitoring the first, second, and third traffic channels to adapt to changing conditions of the first, second, and third traffic channels; and
    selecting the third traffic channel based on the changing conditions of the first and second traffic channels.

11. The method of claim 9, wherein the third traffic channel is (i) the first traffic channel, or (ii) different from the first traffic channel.

12. A method of transferring data over a first traffic channel according to a first communication protocol and over a second traffic channel according to a second communication protocol different from the first communication protocol, the method comprising:
  receiving a request for data;
  identifying first and second data components of the requested data; and
  conveying (i) the first data component over the first traffic channel according to the first communication protocol, (ii) the second data component over the second traffic channel according to the second communication protocol, and (iii) a duplicate of the second data component over the third traffic channel according to the first communication protocol.

13. The method of claim 12, further comprising:
  determining that the second data component and the duplicate of the second data component are associated with the first data component; and
  instructing a receiving device to combine the first data component from the first traffic channel with at least one of the second data component from the second traffic channel and the duplicate of the second data component from the third traffic channel.

14. The method of claim 12, further comprising:
  prioritizing the first and second data components into first and second priorities, respectively; and
  generating the duplicate of the second data portion based on a determination that the second priority is higher than the first priority.

15. The method of claim 12, further comprising evaluating the first and second traffic channels according to one or more of a traffic speed, cost, and reliability of the first and second traffic channels.

16. The method of claim 12, wherein (i) the first communication protocol is a cellular communication protocol and the second communication protocol is a Wi-Fi communication protocol, or (ii) the first communication protocol is a Wi-Fi communication protocol and the second communication protocol is a cellular communication protocol.

17. A non-transitory computer readable medium comprising instructions that, when executed by a processor of a multichannel communication network, direct the processor to transfer requested data by directing the processor to:
  convey (i) a first data component of the requested data over a first channel according to a first communication protocol, (ii) a second data component of the requested data over a second channel according to a second communication protocol different from the first communication protocol, and (iii) a duplicate of the second data component over a third channel according to the first communication protocol.

18. The computer readable medium of claim 17, wherein (i) the first communication protocol is a cellular communication protocol and the second communication protocol is a Wi-Fi communication protocol, or (ii) the first communication protocol is a Wi-Fi communication protocol and the second communication protocol is a cellular communication protocol.

19. The computer readable medium of claim 17, further comprising instructions that direct the processor to:
  determine that the second data component and the duplicate of the second data component are associated with the first data component; and
  direct a remote receiving device to combine the first data component from the first channel with at least one of the second data component from the second channel and the duplicate of the second data component from the third channel.

20. The computer readable medium of claim 17, wherein the third traffic channel is (i) the same as the first traffic channel, or (ii) different from the first traffic channel.

* * * * *